(12) United States Patent
Debrouse et al.

(10) Patent No.: US 10,662,111 B2
(45) Date of Patent: May 26, 2020

(54) BIOPOLYMER FORMULATIONS AND METHODS OF USE THEREOF

(71) Applicants: Daniel Debrouse, Walnut Creek, CA (US); Terrence Rockwell, Walnut Creek, CA (US)

(72) Inventors: Daniel Debrouse, Walnut Creek, CA (US); Terrence Rockwell, Walnut Creek, CA (US)

(73) Assignee: Advanced Molar Innovation, Inc., Cheyenne, WY (US)

( * ) Notice: Subject to any disclaimer, the term of this patent is extended or adjusted under 35 U.S.C. 154(b) by 518 days.

(21) Appl. No.: 14/929,725

(22) Filed: Nov. 2, 2015

(65) Prior Publication Data

US 2017/0121489 A1    May 4, 2017

(51) Int. Cl.
*C04B 26/28* (2006.01)
*C04B 103/00* (2006.01)

(52) U.S. Cl.
CPC ...... *C04B 26/28* (2013.01); *C04B 2103/0072* (2013.01)

(58) Field of Classification Search
None
See application file for complete search history.

(56) References Cited

U.S. PATENT DOCUMENTS

2007/0241482 A1* 10/2007 Giller .................. B29C 67/0066
264/494

* cited by examiner

*Primary Examiner* — Melvin C. Mayes
*Assistant Examiner* — Colette Nguyen
(74) *Attorney, Agent, or Firm* — R. William Graham

(57) ABSTRACT

A polymeric formulation for "green" building materials for replacement of end products commonly formed from a broad range of materials, such as concrete and mixes thereof, cement and mixes thereof, petrochemical based mixes and products thereof, rubber, plastic wood domestic and commercial shingles of all types including cedar wood and ceramic verities, flooring of all types including ceramic tiles, recreational vehicles for water use and sports such as boats, automobile components and bodies, electrical wire coatings, all types of pipes commonly used in the plumbing, gas and oil industries including the replacement of pipes traditionally formed from poly vinyl chloride formulations, bricks and all other forms of architectural structures to list but a few. A method by which a biopolymer can be generated using a process requiring no heat or any other form of energy using an ionized aqueous cure agent is sprayed over a molded gel.

14 Claims, No Drawings

BIOPOLYMER FORMULATIONS AND METHODS OF USE THEREOF

BACKGROUND OF INVENTION

Field of Invention

The instant invention relates to green building material sodium alginate. More particularly, the invention relates to improvements in building materials employing alginates.

Prior Art

There are various building materials used in the building and construction industry and methods of making these building materials. There are building materials which can be produced, processed, or treated which use alginate polymers. One of these is sodium alginate in the form of a gel which has thus far been used in such materials as a firebreak to effectively stop the advance of grass fires, wildfires, and forest fires. Such building materials possess a polymeric material component which confers flame and heat resistance. The polymer component comprises sodium alginate which is combined with a building or construction material matrix. The sodium alginate is converted into calcium alginate by exposure to a calcium solution or by exposure to calcium inherent in the material matrix to which the sodium alginate is added. The alginate polymer of prior art substances are cross-linked to resist fungal degradation.

SUMMARY OF THE INVENTION

It is an object to improve building materials.

A further object is to render an improved biodegradable building material.

Another object is to improve the method of making a biodegradable building material.

The presently claimed and disclosed inventive concept(s) contemplates a novel formulation for the replacement of petrochemical products and cement, concrete and mortar products in addition to a broad range of other building materials. The biopolymer formulation used for the replacement of these traditional matrixes is completely biodegradable upon burial in soil and the addition of water and enzymes.

An aspect of the invention is directed to a bi-polymer formulation for use in making building material product. The bi-polymer formulation includes a high viscosity sodium alginate powder in an amount from about 0.05 to 5% by weight based upon the total combined weight of said formulation, aluminum oxide in an amount from about 0.05 to 5% by weight based upon the total combined weight of said formulation, amorphous fumed silica in an amount from about 0.05 to 5% by weight based upon the total combined weight of said formulation, and optionally silicon carbide in an amount from about 0.01 to 5% by weight based upon the total combined weight of said formulation. A liter of water admixed to the base composition to form a gel. The formulation further includes about a 15 to 25% by weight calcium chloride solution surface applied to said gel to form a substitute building material, such as plastic or concrete.

Another aspect of the invention is directed to a method. The method of producing a the method includes the steps of providing a base composition of a high viscosity sodium alginate powder in an amount from about 0.05 to 5% by weight based upon the total combined weight of said formulation, aluminum oxide in an amount from about 0.05 to 5% by weight based upon the total combined weight of said formulation, amorphous fumed silica in an amount from about 0.05 to 5% by weight based upon the total combined weight of said formulation; and admixing a liter of water to the base composition to for form a gel; and applying about a 15 to 25% by weight calcium chloride solution to a surface of the formed gel to substitute building material.

The method includes the step of providing silicon carbide in an amount from about 0.01 to 5% by weight based upon the total combined weight of the formulation as part of the base composition. The method includes prior to the recited steps providing a mold and spray coating said mold with said calcium chloride solution and then performing said steps with first placing the base composition in the mold.

The end products of the biopolymer formulation are 100% resistant to fire, explosion, microbial growth, water, temperature extremes and ultraviolet irradiation.

The biopolymer formulation presently claimed and disclosed is manufactured in the absence of organic solvents, being aqueous in base and is cured from a gel state to a rubber state upon contact with an ionized water cure agent and then air dried to its desired traits. The entire formula and manufacturing process is "green" in origin.

The materials which are produced using the alginate polymers of the presently claimed and disclosed inventive concepts are an improvement over the art. While the invention is believed to have application in a wide range of building materials and enable biodegradation. Such uses include cement, concrete, mortar products wood products including, but not limited to, pressed boards containing saw dust, wood dust, stranded wood and/or wood chips, plywoods constructed from such pressed boards, lumber, boards, beams, trusses, studs, and other forms of cut or sawn woods, laminates, and other cellulosic materials (e.g., bamboo, cork, and other woody materials); masonry products including, but not limited to, concrete, cement, grout and mortar, concrete blocks of all types, masonry pigments, concrete for slabs, walls, footings, and roadways, concrete precasts of all types, architectural precast sills, copings, features, medallions and caps, architectural cast stones and simulated stone, plasters of all kinds, stuccos of all kinds, bricks of all types, concrete or clay roof units, all masonry or concrete based products; wall and roofing materials including, but not limited to, asphalt shingles, wood shingles, composite shingles, and synthetic shingles, gypsum and all gypsum based products, drywall, siding matrixes of all kinds, fiberglass and fiberglass based products; flooring materials including, but not limited to, vinyls, carpets, wood, wood laminates, stone, synthetic stone tiles, concrete, and concrete or cement-based flooring materials, ceramics; electrical materials including, but not limited to, electrical devices, wire coatings and switches; insulating materials such as, but not limited to, fiberglass batting of all types; countertop materials including, but not limited to, formicas, composites, stone, synthetic stone, crushed stone or minerals, or concrete; plumbing materials including, but not limited to, flex pipe and pipe insulators; paints materials including, but not limited to, paints, paint pigments, and paint compounds; and glass, plastics, and rubber materials. Further, sodium alginate in the form of a gel may be used as a firebreak to effectively stop the advance of grass fires, wildfires, and forest fires. Other uses of the presently claimed and disclosed inventive concepts will become apparent upon review of the description provided below.

DETAILED DESCRIPTION OF THE INVENTION

The description herein of several embodiments describes non-limiting examples that further illustrate the presently claimed invention and disclosed inventive concepts. In the following detailed description, numerous specific details are set forth in order to provide a more thorough understanding of the disclosure. However, it will be apparent to a person having ordinary skill in the art that the present disclosure may be practiced without these specific details. In other instances features which are well known to persons of ordinary skill in the art have not been described in detail to avoid complication unnecessarily the description. Therefore, unless defined otherwise, all technical and scientific terms used herein have the same meanings as commonly understood by one skilled in the art to which the presently claimed invention and disclosed inventive concept(s) pertains. For example, the term "plurality" refers to "two or more." The singular forms "a," "an," and "the" include plural referents unless the context clearly indicates otherwise The presently claimed and disclosed inventive concept(s) is directed in one embodiment to a process for the production of those products traditionally prepared from petrochemical origin. For example, any form of rigid functional plastic may be formulated from a mixture of sodium alginate, aluminum oxide, calcium and water. The mixture is agitated into a homogeneous gel state and then molded into a desired shape where it is brought into contact with an aqueous calcium chloride solution which upon contact converts the gel into a solid rubber state through an ionic exchange reaction in which calcium takes the place of sodium ions present on the alginate molecule causing a cross-linking of polymers. Upon cross-linking water solubility is lost and the excess water pushed out from the end product naturally without necessary external mechanical influence. The end product may then be dried by any of a number of processes currently in industrial practice to its end specifications.

Cement, concrete and mortar replacements can be made from a mixture of sodium alginate, silicon carbide, aluminum oxide, amorphous silica and/or fumed silica either of hydrophobic or hydrophilic origin calcium and water. The mixture is agitated to a homogeneous gel, poured in a form or mold and then treated with aqueous calcium chloride solution to begin the curing process. The biopolymer shape initially setup in a rubber state which is insoluble in water and dries as water is pushed out. All end products generated from the biopolymer formulation cure to objects that are fireproof, explosion proof, water, temperature and microbial resistant of compression strengths ranging to >100,000 psi.

EXAMPLES

Example 4

Preparation for Plastic Replacement 14.0 g of high viscosity sodium alginate powder, 10.5 g of aluminum oxide and 24.5 g of amorphous fumed silica were weighed into a mixing bowl. 1 liter of water was added and the mixture was homogenized to a gel state containing no lumps. A styrofoam mold of a toy Lego building block was prepared by cutting the shape out, The surface of the mold was wetted with calcium chloride cure agent (which was prepared by adding 22 g of calcium chloride to 100 mL of water). Next enough gel was poured into the mold to fill the shape and the shape was misted with 20 mL of the cure agent and allowed to stand for 30 seconds. After 30 seconds the shape floated up out of the mold and was placed on a flat surface to dry.

Example 2

Preparation for Concrete Replacement 14.0 g of high viscosity sodium alginate powder, 1.0 g silicon carbide, 3.5 g of aluminum oxide and 24.5 g of amorphous fumed silica were weighed into a mixing bowl. 1 liter of water was added and the mixture was homogenized to a gel state containing no lumps.

A wood mold of a square shape was prepared. The surface of the mold was wetted with calcium chloride cure agent (which was prepared by adding 22 g of calcium chloride to 100 mL of water). Next enough gel was poured into the mold to fill the shape and the shape was misted with 20 mL of the cure agent and allowed to stand for 30 seconds. After 30 seconds the shape floated up out of the mold and was placed on a flat surface to dry.

By so providing, the invention enables a biopolymer formulation consisting of all natural renewable constituents for the production of those materials commonly used in the construction of building, plumbing, packaging and piping including alt petrochemical based product materials. An end product made is provided from an all natural biopolymer that can be used for the replacement of a multitude of products. For example, for the replacement of plastics, rubbers, woods, paints, bricks, masonry products, cement, concrete, automobile bodies and components, boats, pipes such as pvc piping, shingles, ceramic tiles and other flooring materials, storm shelters, electrical wire coatings and petrochemical based product.

The invention also provides for a green manufacturing process in which bio organic solvents are used at any stage requiring no energy input for the manufacture of the end products. Furthermore, a "green" process in which a gel of the biopolymer formulation is cure instantly to a rubber state upon contacting an ionized aqueous cure agent. The rubber formed product is then allowed to air cure to its final characteristics. A biopolymer formulation of sodium alginate, potassium alginate, calcium alginate, magnesium alginate and zinc alginate can be included. Silicon carbide, and silicon di-carbide, aluminum oxides as Al I, Al II, and Al III, amorphous silica, fumed silica either hydrophobic or hydrophilic and fly ash can be included. Various water types can be included. An ion such as sodium, calcium or potassium can be included. Calcium chloride can be added to water in the formulation of the reagent.

The current invention also provides a method by which the end products of the biopolymer may be generated using a process requiring no heat or any other form of energy input what-so-ever nor the presence or addition of organic solvents of any kind. Rather an ionized aqueous cure agent is sprayed over a molded get solution of the biopolymer causing it to set upon contact to a rubber-like material that is then allowed to dry curing to its desired end product and its resulting associated traits characteristic thereof.

As will be understood as those of skill in the art, the present invention could be embodied in variations, modifications and derivations without departing from the essential characteristics of the invention. Accordingly, reference should be made to the appended claims which set forth the scope of the claimed invention and include such variations, modifications and derivations.

What is claimed is:

1. A biopolymer formulation providing a construction building material product, comprising:
   a base composition including high viscosity sodium alginate powder in an amount from about 0.05 to 5% by weight based upon the total combined weight of said formulation, aluminum oxide in an amount from about 0.05 to 5% by weight based upon the total combined weight of said formulation, amorphous fumed silica in an amount from about 0.05 to 5% by weight based upon the total combined weight of said formulation, a liter of water admixed to said base composition forming a gel and further including about a 15 to 25% by weight calcium chloride solution surface applied to said gel to form a plastic substitute construction building material.

2. The biopolymer formulation providing a building construction material product of claim 1, wherein said high viscosity sodium alginate powder is present in an amount of about 1.5% by weight based upon the total combined weight of said formulation.

3. The biopolymer formulation providing a building construction material product of claim 1, wherein said aluminum oxide is present in an amount of about 1% by weight based upon the total combined weight of said formulation.

4. The biopolymer formulation providing a building construction material product of claim 1, wherein said amorphous fumed silica is present in an amount of about 2.5% by weight based upon the total combined weight of said formulation.

5. The biopolymer formulation providing a building construction material product of claim 1, wherein said high viscosity sodium alginate powder is present in an amount of about 1.5% by weight based upon the total combined weight of said formulation, wherein said aluminum oxide is present in an amount of about 1% by weight based upon the total combined weight of said formulation, and wherein said amorphous fumed silica is present in an amount of about 2.5% by weight based upon the total combined weight of said formulation.

6. A bi-polymer formulation for use in making building material product, comprising:
a base composition including a high viscosity sodium alginate powder in an amount from about 0.05 to 5% by weight based upon the total combined weight of said formulation, silicon carbide in an amount from about 0.01 to 5% by weight based upon the total combined weight of said formulation, aluminum oxide in an amount from about 0.05 to 5% by weight based upon the total combined weight of said formulation, amorphous fumed silica in an amount from about 0.05 to 5% by weight based upon the total combined weight of said formulation, a liter of water admixed to said base composition forming a gel and further including about a 15 to 25% by weight calcium chloride solution surface applied to said gel to form a concrete substitute building material.

7. The bi-polymer formulation of claim 6, wherein said high viscosity sodium alginate powder is present in an amount of about 1.5% by weight based upon the total combined weight of said formulation.

8. The bi-polymer formulation of claim 6, wherein said silicon carbide is present in an amount of about 0.07% by weight based upon the total combined weight of said formulation.

9. The bi-polymer formulation of claim 6, wherein said aluminum oxide is present in an amount of about 0.05% by weight based upon the total combined weight of said formulation.

10. The bi-polymer formulation of claim 6, wherein said amorphous fumed silica is present in an amount of about 2.5% by weight based upon the total combined weight of said formulation.

11. The bi-polymer formulation of claim 6, wherein said high viscosity sodium alginate powder is present in an amount of about 1.5% by weight based upon the total combined weight of said formulation, wherein said silicon carbide is present in an amount of about 0.07% by weight based upon the total combined weight of said formulation, wherein said aluminum oxide is present in an amount of about 0.05% by weight based upon the total combined weight of said formulation, and wherein said amorphous fumed silica is present in an amount of about 2.5% by weight based upon the total combined weight of said formulation.

12. A method of producing a biopolymer formulation comprising:
providing a base composition of a high viscosity sodium alginate powder in an amount from about 0.05 to 5% by weight based upon the total combined weight of said formulation, aluminum oxide in an amount from about 0.05 to 5% by weight based upon the total combined weight of said formulation, amorphous fumed silica in an amount from about 0.05 to 5% by weight based upon the total combined weight of said formulation;
admixing a liter of water to said base composition to form a gel; and
applying about a 15 to 25% by weight calcium chloride solution to a surface of said formed gel to form a substitute building material.

13. The method of claim 12, which further includes the step of providing silicon carbide in an amount from about 0.01 to 5% by weight based upon the total combined weight of said formulation as part of said base composition.

14. The method of claim 12, which includes prior to said steps providing a mold and spray coating said mold with said calcium chloride solution and then performing said steps with first placing said base composition in said mold.

* * * * *